No. 882,977. PATENTED MAR. 24, 1908.
R. SYLVESTER.
TRAVELING THRESHER.
APPLICATION FILED FEB. 4, 1907.

4 SHEETS—SHEET 2.

Witnesses
Albert Popkins
L. F. Brock.

Inventor
Richard Sylvester

By
Chas. H. Riches Attorney

No. 882,977. PATENTED MAR. 24, 1908.
R. SYLVESTER.
TRAVELING THRESHER.
APPLICATION FILED FEB. 4, 1907.
4 SHEETS—SHEET 3.

Witnesses
Albert Popkins
L. F. Brock

Inventor
Richard Sylvester

By
Chas. H. Richer Attorney

No. 882,977. PATENTED MAR. 24, 1908.
R. SYLVESTER.
TRAVELING THRESHER.
APPLICATION FILED FEB. 4, 1907.
4 SHEETS—SHEET 4.
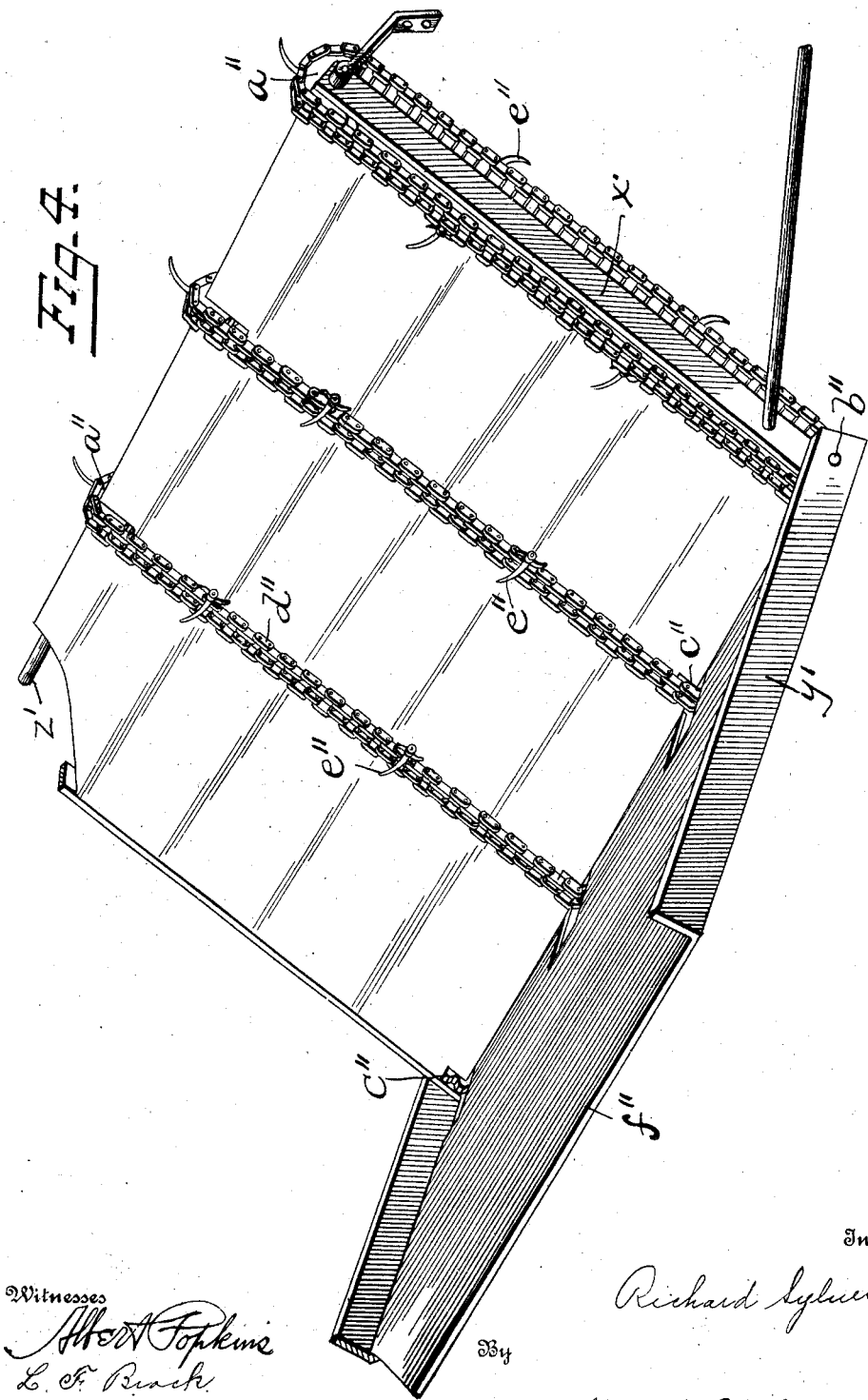

UNITED STATES PATENT OFFICE.

RICHARD SYLVESTER, OF LINDSAY, ONTARIO, CANADA.

TRAVELING THRESHER.

No. 882,977.      Specification of Letters Patent.      Patented March 24, 1908.

Application filed February 4, 1907. Serial No. 355,738.

*To all whom it may concern:*

Be it known that I, RICHARD SYLVESTER, of the town of Lindsay, in the county of Victoria and Province of Ontario, Canada, have invented certain new and useful Improvements in Traveling Threshers; and I hereby declare that the following is a full, clear, and exact description of the same.

This invention relates to the peculiar construction of the feeder and its location on the top of the separator whereby the entire weight of the separator will be evenly balanced on both sides of the axle of the traction wheels, and to a sheaf carrier and elevator positioned at the sides of the feeder to receive the sheaves and evenly and continuously deliver them to the feeder carrier.

For a full understanding of the invention reference is to be had to the following description and to the accompanying drawings in which;—

Figure 1:
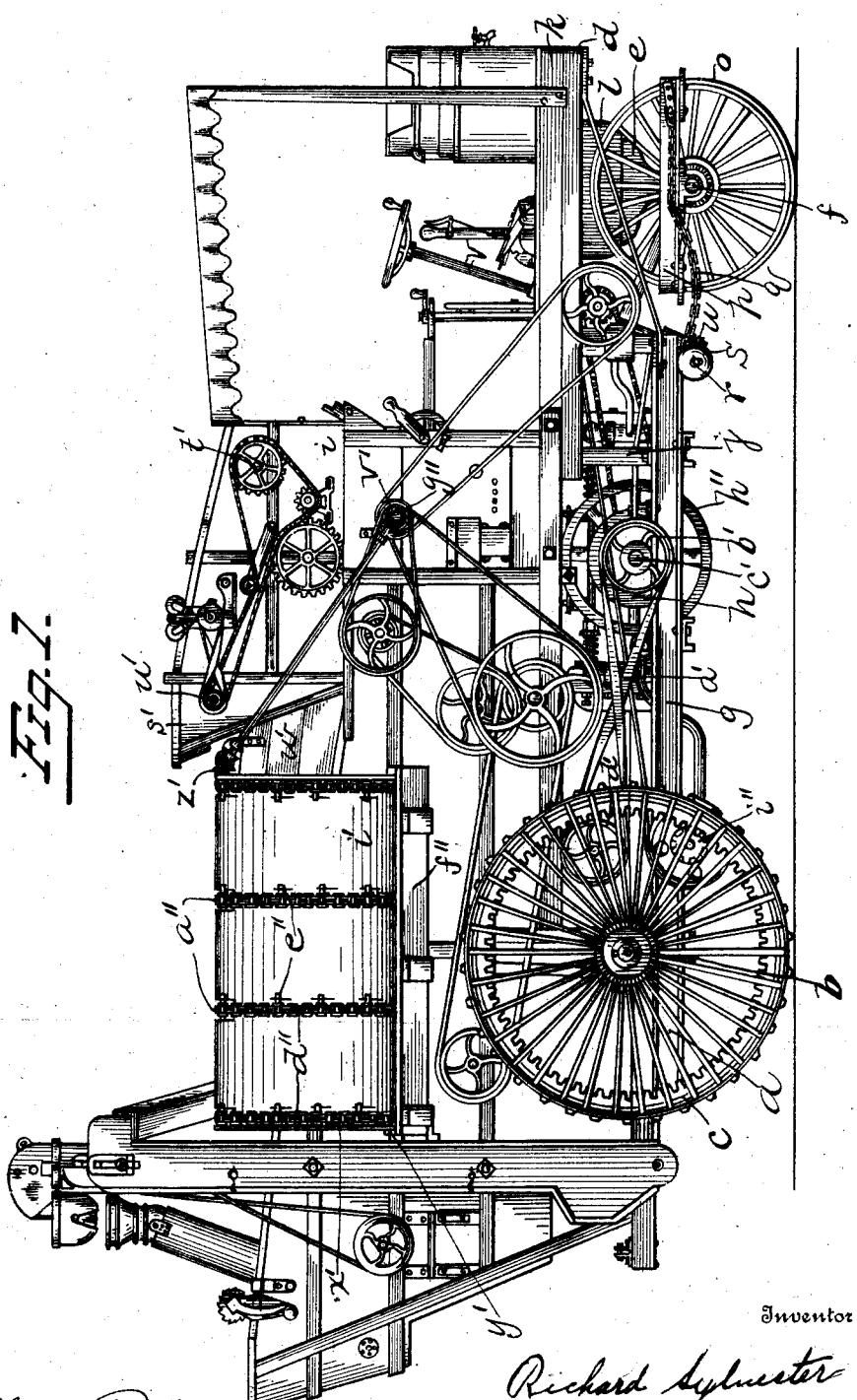
Figure 2:
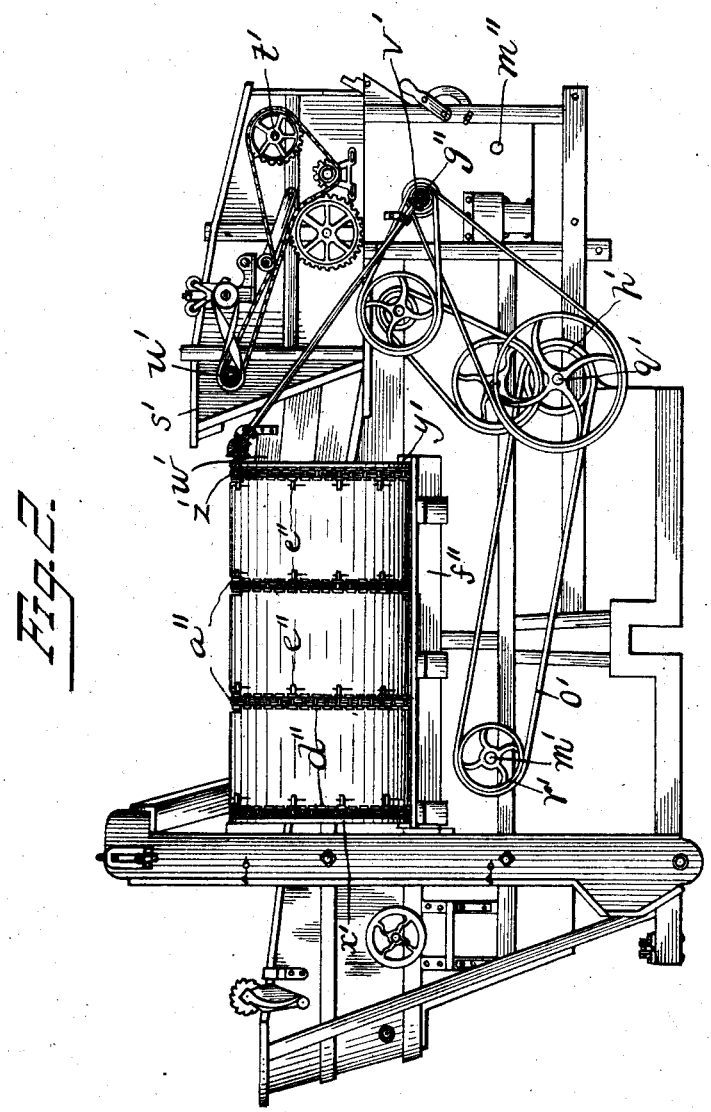
Figure 3:
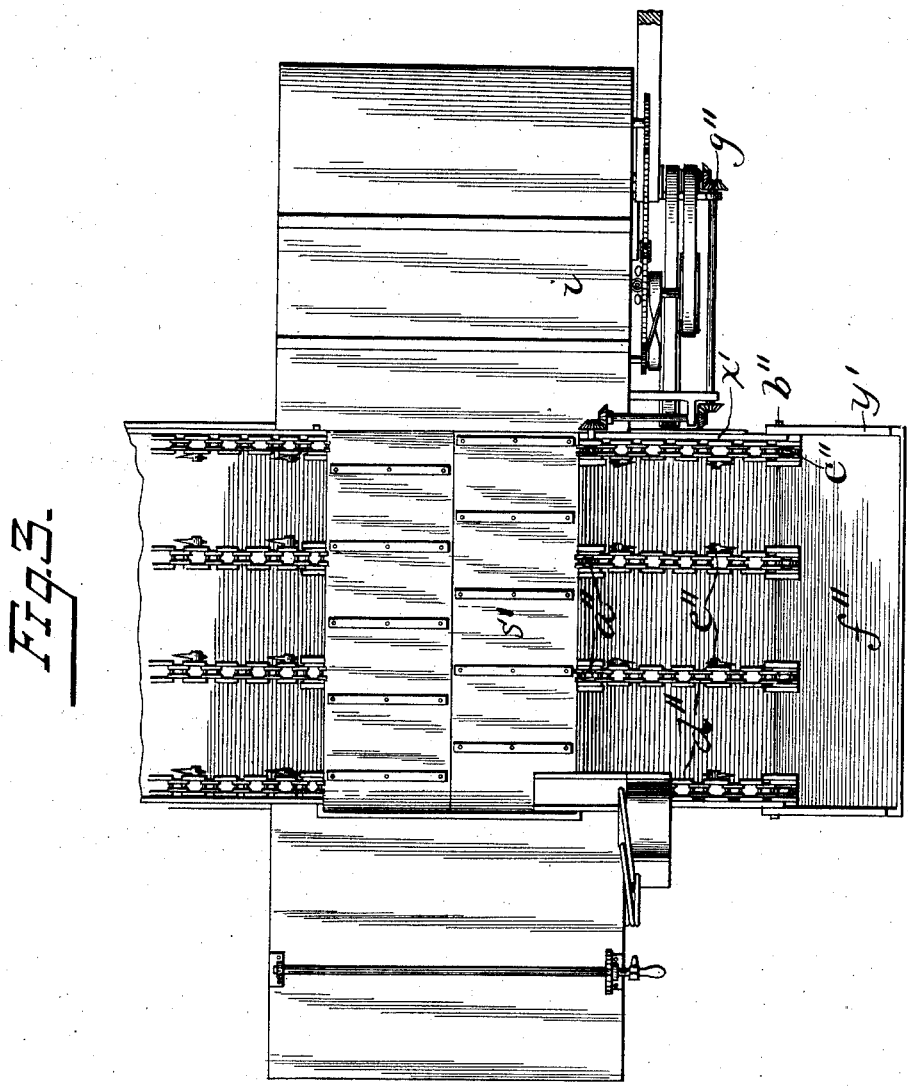

Figure 1 is a side elevation of a traction truck combined with a threshing machine, showing the relative position of the principal parts. Fig. 2 is a detail view showing the separator detached from the traction truck. Fig. 3 is a plan view of the top of the separator. Fig. 4 is a detail view of the sheaf carrier and elevator.

Like characters of reference refer to like parts throughout the specification and drawings.

The traction truck may be described as consisting of, a main carriage *a* supported from the traction wheels *c* by the main carriage axle *b*, and a fore carriage *d* rigidly secured to the front end of the main carriage, and supported from the steering wheels *o* by the fore carriage axle *f* and a double swiveled bracket *e*.

The main carriage *a* is provided with two side beams *g* located below the plane of the arms of the main carriage axle to carry the motor *h*, and the motor mechanism *h''* below the plane of the longitudinal axis of the main carriage axle *b*, so that the weight of the traction truck and its motor mechanism will be below the center of gravity of the apparatus to assist in counterbalancing th weight of the load carried by the tractior truck.

The fore carriage *d* is rigidly connected to the main carriage *a* by uprights *j*, fastened to the side beams *g* and to the framing of the fore carriage platform *k*, to hold the fore carriage platform *k* in a plane parallel with the side beams *g* and at a higher elevation than the plane of the motor *h* and thus provide for the location of the steering wheels *o* below it and within the plane of its sides with sufficient clearance between the parts of the fore carriage platform and the top of the steering wheels to permit of the free movement of the latter.

The steering wheels *o* are mounted on the arms of the fore carriage axle *f* which is connected with the sill *l* of the fore carriage platform by a swivel bracket *e* which permits the fore carriage axle *f* to swing radially in an horizontal or substantially horizontal plane when guiding the direction of the movement of the traction truck and to rock vertically so that the wheels can adapt themselves to the surface over which the traction truck is traveling. By this means it is possible to readily control the direction of the movement of the traction truck under favorable and unfavorable conditions, and to maintain the equilibrium of the parts of the traction truck and the apparatus carried thereby and thus minimize its vibrating and twisting movements originating from the unevenness of the surface on which the wheels are traveling.

Connected to the arms of the fore carriage axle *f* on the outer side of the steering wheels *o* are the side bars *p* of the steering frame. The steering frame embraces the steering wheels preferably above the plane of the axle with sufficient clearance between itself and the steering wheels to allow of the free revolution of the latter. Connected to the side bars of the steering frame in front of the arms of the fore carriage axle *f* are steering chains *q* adapted to be wound on the winding drums *s* actuated by the worm shaft *r*. The worm shaft *r* is journaled in bearings connected to the side beams *g* of the main carriage and is actuated by the worm gear *u* driven by the steering mast *v*. The revolution of the steering mast in either direction actuates the worm shaft of the winding drums to simultaneously wind one of the steering chains and unwind the other when controlling the direction of the steering wheels and thus cause a quick responsive action of the fore carriage axle owing to the leverage exerted by the steering chains resulting from their attachment to the steering frame at the sides of the steering wheels in front of the fore carriage axle. This construction of the steering mechanism renders the steering wheels extremely sensitive to any desired change of direction and renders it possible to readily control the direction of the traction truck under favorable and unfavorable conditions.

The traction truck is employed to carry and support the separating mechanism of a threshing outfit which may be described as consisting of a separator $i$ detachably supported at its front end on the rear end of the fore carriage platform $k$ and its rear end on the side beams $g$ of the main carriage, with the weight of the separator distributed approximately evenly on each side of the main carriage axle, so that the main carriage axle can carry it and relieve the fore carriage of the major part of the weight of the apparatus.

The motor $h$ is located on the main carriage $a$ below the front end of the separator $i$ and in rear of the fore carriage $d$ and is rigidly supported by the frame work carried by the side beams $g$ of the main carriage $a$.

On the top of the separator $i$ is the feeder mechanism $s'$ which extends from the front end of the separator to a place vertically in rear of but above the main carriage axle with the beater shafts $t'$ and the band cutter shaft $u'$ located above the cylinder shaft $v'$ and the usual side boards $w'$ and the usual carrier belts contained between the side boards located in the rear of the cylinder shaft, and nearly vertically over the main carriage axle to reduce the dimensions of the machine and make it as compact as possible in addition to distributing its weight on the main carriage axle.

At each side of the separator $i'$ above the traction wheels $c$ is a sheaf carrier consisting of two sheaf carrier sides $x'$ articulatingly connected to the framing of the separator with their upper ends adjacent to the top of the feeder side boards $w'$ and their lower ends movable towards or away from the separator sides so that the sheaf carrier can be selectively positioned either in a vertical plane against the separator sides when not in use, or arranged at an inclination thereto when in operation.

Articulatingly connected to the sheaf carrier sides $x'$ are other sheaf carrier sides $y'$ which can be selectively folded against the sheaf carrier sides $x'$ or extended at an angle thereto. Journaled at the top of the sheaf carrier sides $x'$ is a driven shaft $z'$ on which are mounted sprocket wheels $a''$ and journaled at the lower ends of the sheaf carrier sides $x'$ is a sprocket wheel shaft $b''$ on which are mounted sprocket wheels $c''$.

Alined with the sprocket wheels $a''$ and traveling around the sprocket wheels $a''$ and $c''$ are traveling belts $d''$ to which are connected pivoted fingers $e''$ to engage the sheaves and carry them to the top of the sheaf carrier sides $x'$ as the driven shaft $z'$ revolves and dump them over the feeder side boards $w'$ on the feeder belts. The sheaf carrier sides $y'$ are provided with a sheaf carrier bottom $f''$ which supports the sheaves until they are engaged by the pivoted fingers. The driven shaft $z'$ is actuated preferably from the cylinder shaft $v'$ by a suitable transmission gear $g''$ to enable the sprocket chains and pivoted fingers of the sheaf carrier to move at a corresponding rate of speed to the capacity of the cylinder and continuously deliver the sheaves from the sheaf carrier to the feeder in accordance with the capacity of the apparatus.

Having thus fully described my invention what I claim as new and desire to secure by Letters Patent is:

A threshing machine comprising a traction truck consisting of a main carriage, a set of traction wheels located at the sides of the main carriage, a main carriage axle for the traction wheels from which the main carriage is supported, side beams for the main carriage located below the plane of the main carriage axle, a motor supported by the side beams, uprights connected to the front ends of the side beams, a fore carriage supported at its rear end by the uprights, steering wheels pivotally connected to the fore carriage, a separator detachably connected to the traction truck and mounted on the main carriage in rear of the fore carriage, and a feeder located at the top of the separator and extending over the main carriage axle whereby the separator is comparatively evenly balanced on both sides of the main carriage axle.

Signed at Lindsay, December 31st, A. D. 1906.

RICHARD SYLVESTER.

Witnesses:
L. E. SYLVESTER,
MADGE L. FLEET.